K. MURAI.
BOILER KEIR.
APPLICATION FILED JUNE 30, 1917.
1,254,343.
Patented Jan. 22, 1918.
4 SHEETS—SHEET 1.
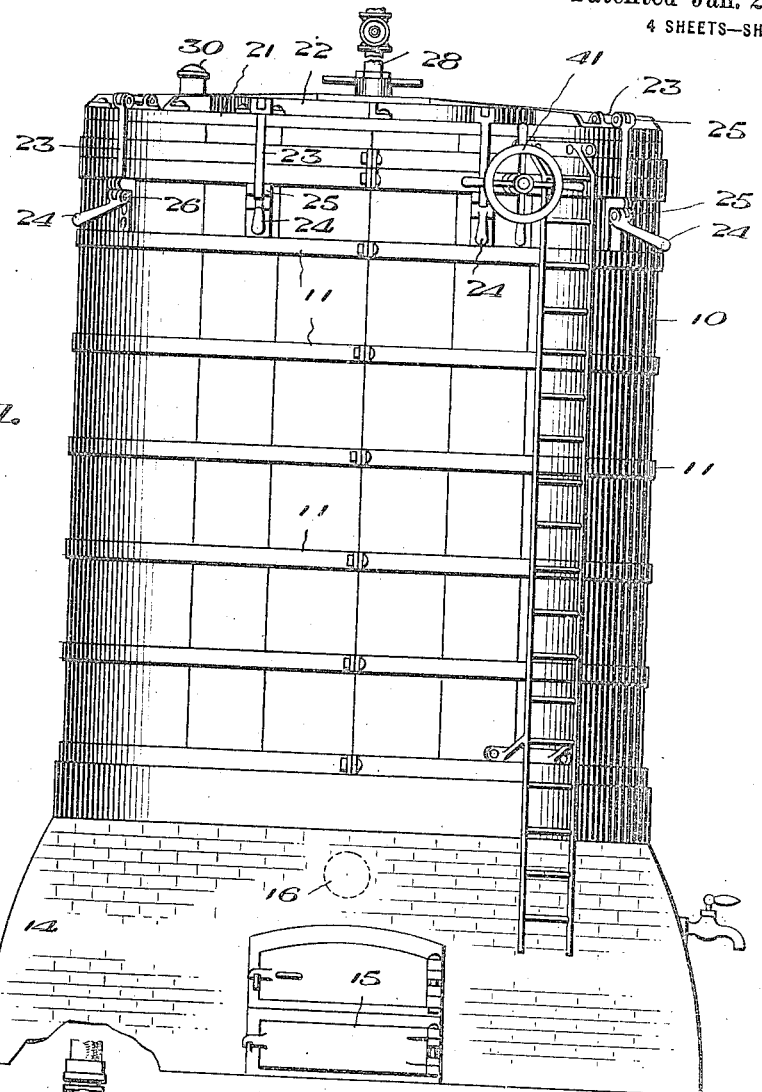
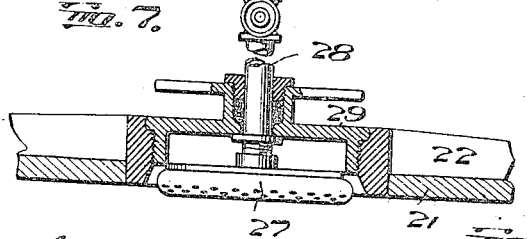
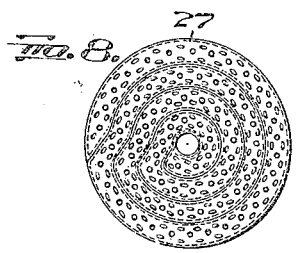
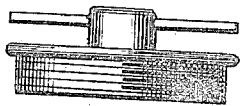

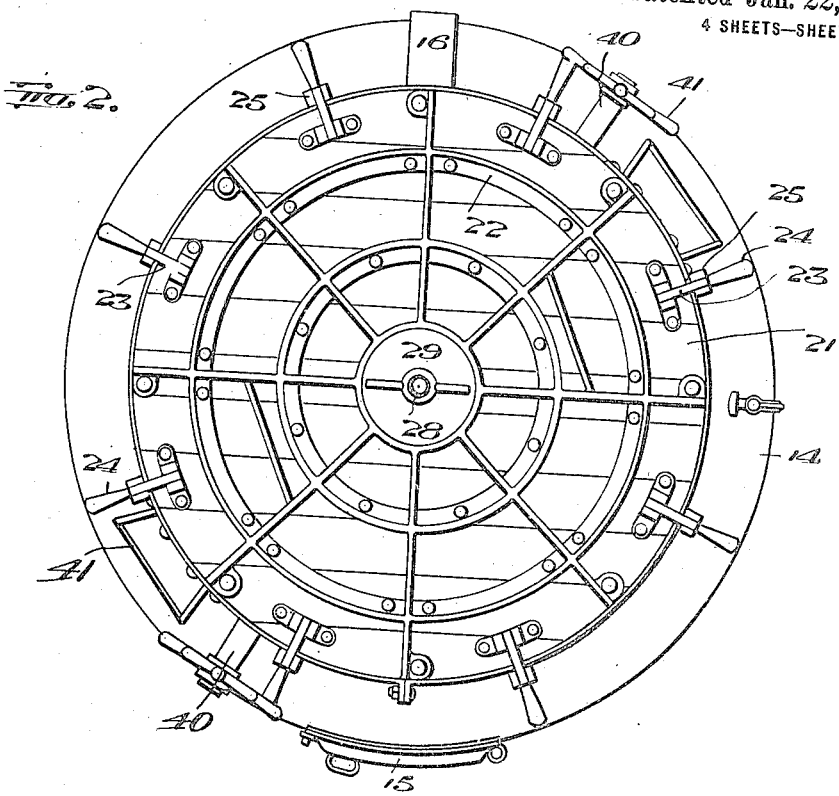
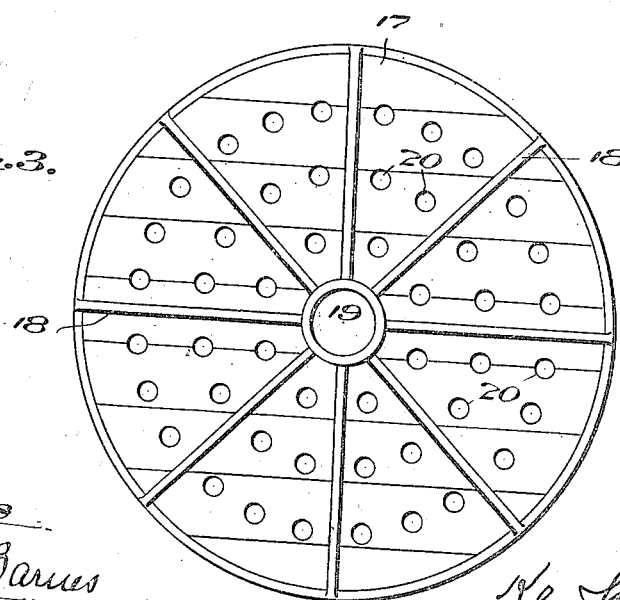

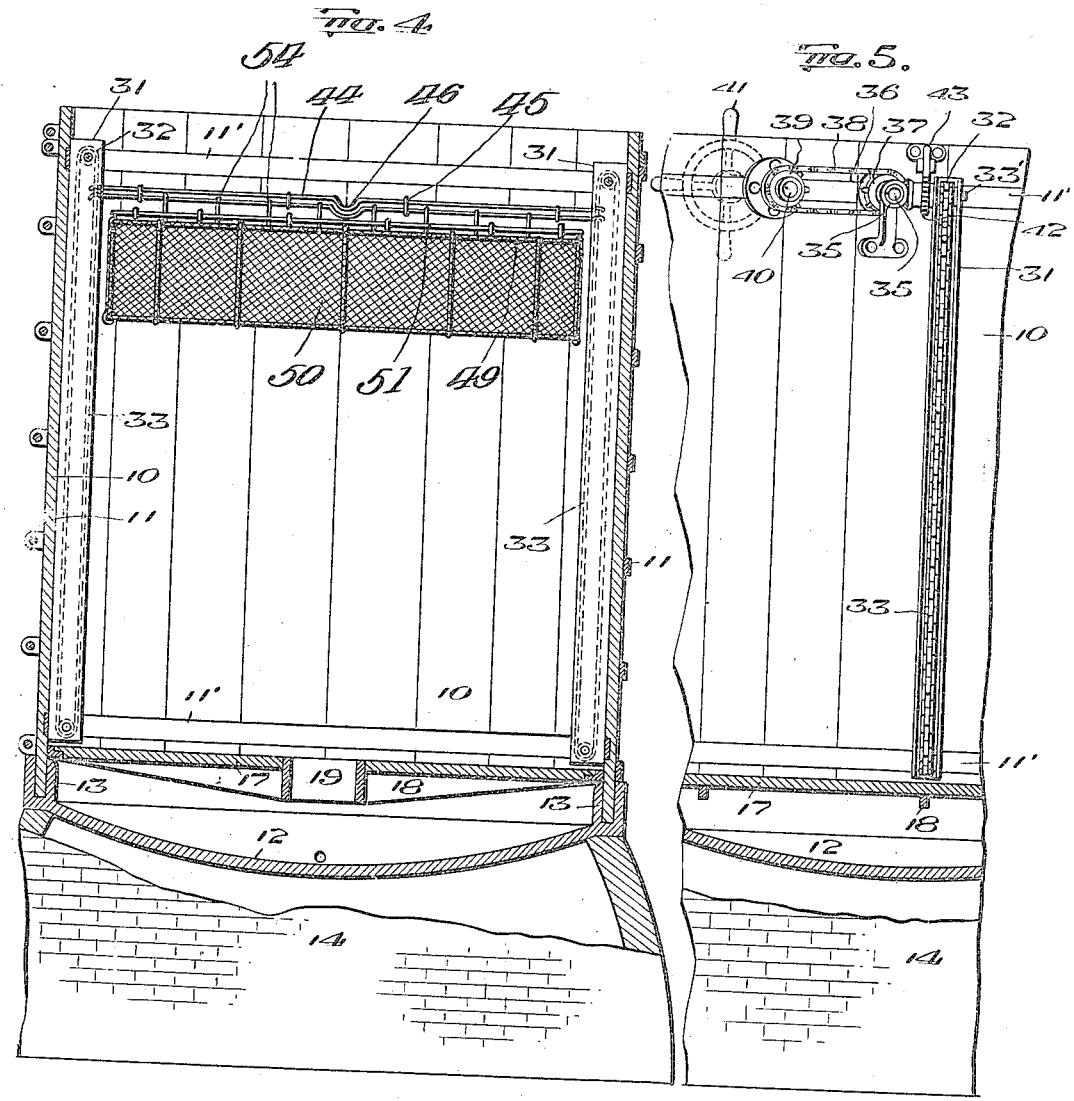
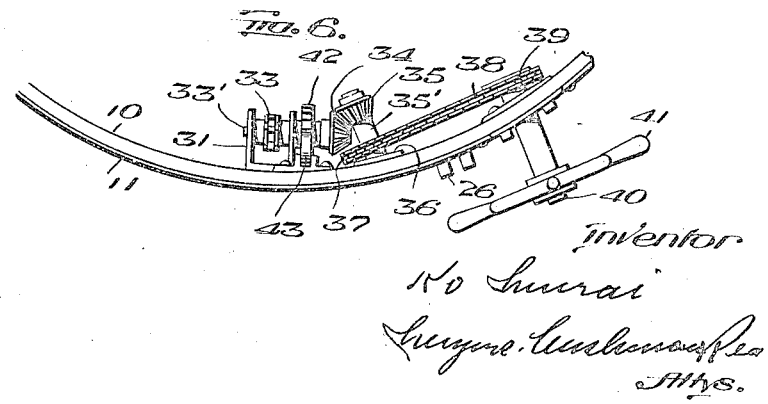

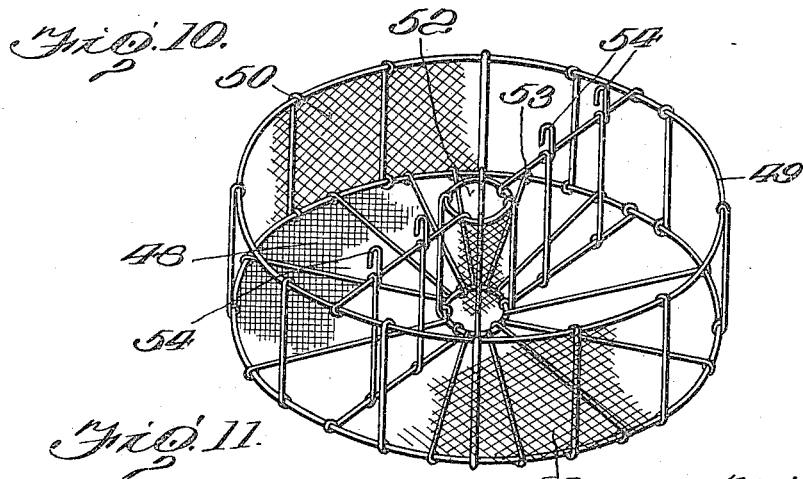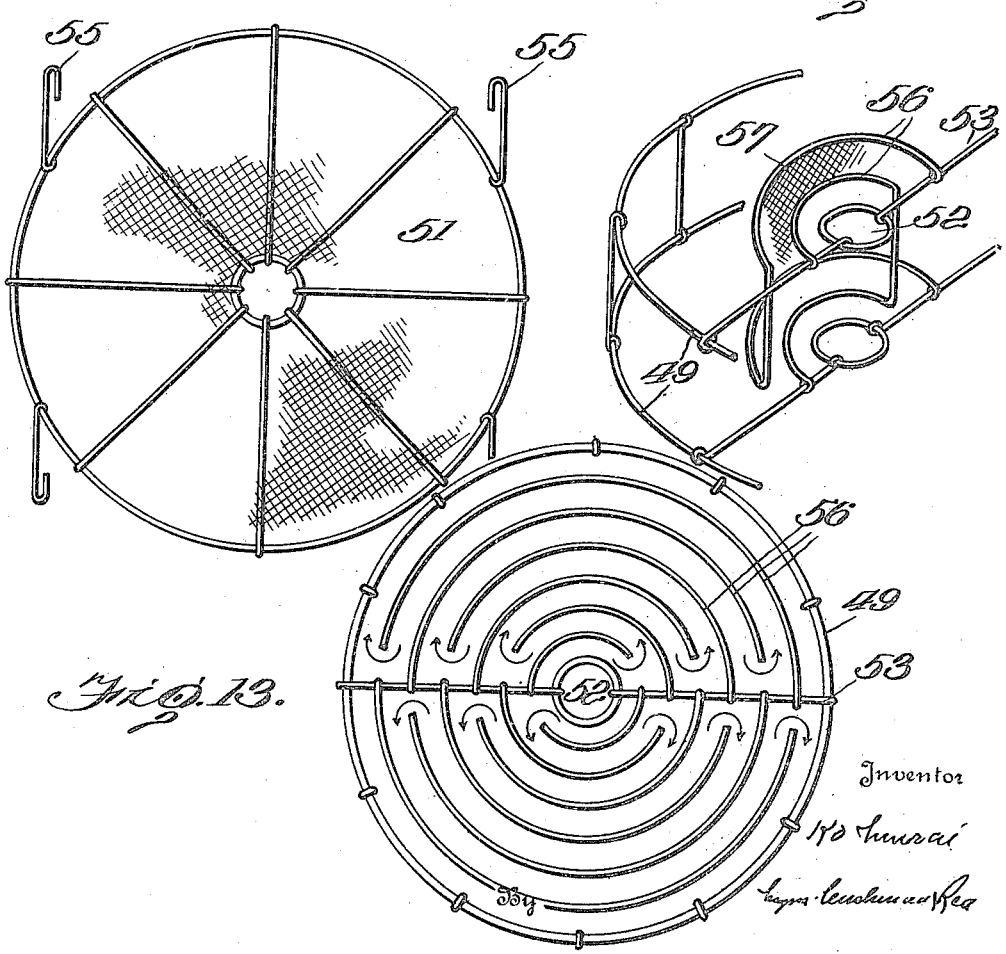

UNITED STATES PATENT OFFICE.

KO MURAI, OF SAN FRANCISCO, CALIFORNIA.

BOILER-KEIR.

1,254,343.  Specification of Letters Patent.  Patented Jan. 22, 1918.

Application filed June 30, 1917. Serial No. 178,047.

*To all whom it may concern:*

Be it known that I, Ko MURAI, a subject of the Empire of Japan, residing at the city and county of San Francisco and State of California, have invented new and useful Improvements in Boiler-Keirs, of which the following is a specification.

This invention relates to apparatus for use in the treatment of fibrous plants to obtain the fibers therefrom, and has particular reference to a boiling keir in which the plants are treated to a chemical process for the purpose of removing gummy or ligneous and other foreign matters from the fibers, and also to a container or basket in which the plants are packed for treatment in the keir.

In the extraction of fibers from plants, the method usually employed is to subject the plants to a crushing and rolling action so as to loosen or break the gummy or ligneous matters which cement the fibers together and mechanically separate the fibers as much as practical. The fibers are then boiled in a water or chemical bath so as to remove the gummy matters and all foreign impurities. After further treatment, the extent and refinement of which depends upon the plant being treated, and the use to which it is applied, the fibers are in a condition to be made up into cordage, rough fabrics, and the like.

The present invention has as its objects to provide an improved tank or keir in which the crushed plants are to be boiled, and while my apparatus may be employed in the treatment of any plant from which fibers may be obtained, it is particularly adapted for use in connection with plants commonly known as tule, or bullrush, and which plants belong to the *Scirpus* family. My improved keir is very simple in construction, and may be economically manufactured and installed. It is efficient in operation, and the plants packed in my improved container or basket, herein described, may be easily and quickly placed into and removed from the keir.

A further object of my invention is to provide an improved basket or container for receiving the plants to be treated in the keir. The arrangement of the basket is such that it will accommodate fibers of the longest length without the necessity of cutting the fibers into predetermined lengths, and the fibers may be so packed within the container that they cannot become entangled during the boiling operation.

The above and other objects of my invention are obtained in the apparatus described in the following specification and illustrated in the accompanying drawings, wherein—

Figure 1 is a front elevational view of my improved keir.

Fig. 2 is a top plan view thereof.

Fig. 3 is a bottom plan view of the false bottom located within the boiling tank.

Fig. 4 is a vertical transverse section taken through the apparatus shown in Fig. 1.

Fig. 5 is a fragmentary sectional view taken at right angles to Fig. 4, and shows the means for raising and lowering the baskets within the boiling tank.

Fig. 6 is a top plan view of the structure shown in Fig. 5.

Fig. 7 is an enlarged detail sectional view, taken through the central portion of the cover of the tank, and showing the manner of mounting a spraying device through which water or a chemical solution is admitted to the tank.

Fig. 8 is a bottom plan view of the nozzle shown in Fig. 7.

Fig. 9 is a screw plug for closing the opening occupied by the nozzle in Fig. 7.

Fig. 10 is a perspective view of the framework of the basket.

Fig. 11 is a plan elevation of the cover of the basket.

Fig. 12 is a perspective fragmentary view of the basket, showing one of the partitions thereof.

Fig. 13 is a top plan diagrammatical view of the basket, showing the particular arrangement of the partitions.

Referring to the drawings, wherein like numerals represent like parts in the several views, 10 designates a boiling tank which is preferably circular in cross-section and constructed of wood, so that it may be easily transported, and the first cost of production is at a minimum. The tank may be surrounded by removable iron bands 11, and, of course, any number of such bands may be employed.

The bottom of the tank is designated by the numeral 12, and as noted in Figs. 4 and 5, the bottom is dish-shaped, and has at its edge an upstanding flange provided with annular groove 13 in which the lower ends of the boards or planks, of which the body portion of the tank is constructed, engage. By this arrangement, a water-tight joint is provided between the side walls and the bottom of the tank for the wooden sides will expand and completely fill the groove 13. The tank 10 rests upon the furnace structure 14, the walls of which are preferably of brick, and the flames of the furnace are adapted to directly heat the iron bottom 12, so that an economy in fuel is obtained. The furnace is provided with the usual doors 15 for charging of the furnace and removing ashes therefrom, and a flue 16, opening through the rear wall of the furnace, as shown in Fig. 1, is provided for carrying off smoke and products of combustion.

Located within the tank is a false bottom 17 comprising a disk of preferably the same diameter as the internal diameter of the tank so as to rest upon the ledge provided by the upstanding flange of the iron or metal bottom 12. The false bottom is preferably constructed of wood having reinforcing iron members 18. The bottom 17 has a central opening 19 and a number of spaced holes 20, so as to prevent localization of the heat and consequently impairment of the plants lowered to the bottom of the tank. The openings in the false bottom 17 permit the water or chemical solution within the tank to circulate, and the heat is thus equally distributed.

The tank is covered with a top 21 preferably constructed of wood, and reinforced by means of an iron frame 22. The top is secured in place by means of pivoted latches 23, which carry at their lower ends handles 24 whereby the links are adapted to be moved into position between ears 25 carried by the body portion of the tank, and, if desired, the handles at their inner ends may carry eccentrics 26 so that, when the handle is forced downwardly, the top is securely brought to its seat.

As shown in Fig. 7, the top is centrally apertured for the reception of a nozzle 27 to which is connected a pipe 28 for admitting water or a chemical solution to the nozzle from which it issues into the tank. The nozzle is carried by a plug 29 which is screw-threaded into the central opening, and, if desired, the plug may have a packing-gland as shown, so as to insure against leakage of vapor or steam. The passageway within the nozzle is preferably coiled as shown in Fig. 8. It is to be understood that when filling the tank with the solution or water, the nozzle is employed, and during the boiling operation the nozzle is removed and a plug, such as shown in Fig. 9, is inserted in the centrally disposed opening of the top. During the boiling operation, pressure within the tank is increased, and to prevent excessive pressure, a safety valve 30 is provided in the top of the tank, and this safety device may be of any suitable construction, and as the specific construction thereof comprises no part of this invention, I have shown it more or less conventionally.

Located within the tank and disposed diametrically opposite to each other are channel irons 31 secured adjacent their opposite ends, to bands 11' passing about the inner periphery of the tank. The channel irons may, of course, be constructed of a single piece or may be built up, as desired. Within the channel irons and adjacent their upper and lower ends are mounted sprocket wheels 32 about which pass chains 33 by means of which the containers or baskets, hereinafter described, are adapted to be lowered and raised within the tank.

For the purpose of causing the chains to travel over their sprocket wheels when raising and lowering the baskets, I have shown each of the upper sprockets 32 as mounted upon a shaft 33' carrying at is outer end a bevel gear 34 meshing with a bevel gear 35 carried by a shaft 35' rotatably mounted within the bracket 36. The shaft on which the gear 35 is mounted, carries a sprocket wheel 37 which is connected by means of a chain 38 to a sprocket wheel 39 carried upon an operating shaft 40. The operating shaft 40 extends through an opening in the wall of the tank, as shown in Fig. 6, and carries at its outer end an operating handle or wheel 41. It will be noted that with this mechanism by rotating the wheels 41, rotary motion will be imparted, through the chain and gear mechanisms described to the sprocket wheels 32 about which the chains 33 pass. For the purpose of locking the chains in adjusted position, the shafts upon which the sprocket wheels 32 are mounted carry ratchet wheels 42 which are held against rotation by a pawl 43.

The tanks are adapted to be charged and operated from an elevated platform, or in an especially constructed building, the tank may be operated from the second floor. Extending between the chains are rods 44 from which the baskets are suspended, and these rods are preferably constructed of two strips secured together by loops 45 and the rods are curved or bent intermediate their ends as at 46, so as to equally distribute the heat.

In Figs. 11 to 13, I have shown one form of basket, in which the fibers are to be packed, and which is to be suspended from the rods 44, as shown in Fig. 4. Each of the baskets is cylindrical in form, and the outside diameter of the same is such that sufficient space is provided between the basket and the walls of the tank 10 to permit circulation of the boiling solution. The basket has a body portion comprising a bottom 48 and cylindrical walls 49, and is formed of a skeleton framework of heavy wire or light steel rods covered with a wire netting or a screen 50. The removable top 51 of the basket, shown in Fig. 11, is also formed of a wire framework covered with a netting or screen. Located centrally of the basket is a through opening 52 to insure a complete circulation of the boiling fluid within the tank. Within the body portion of the basket and equally dividing the same into two chambers, is a transverse wall 53, along the upper edge of which are disposed hooks 54, by means of which the basket is suspended from the rods 44. The cover 51 carries hooks 55, by means of which the cover is secured in place upon the body portion. The container or basket is divided by partitions 56, which are clearly shown in Fig. 12. These partitions are curved concentrically to the walls 49 of the container and are covered with a wire netting 57. Each of the partitions is connected at one end to the transverse wall 53, but terminates at its other end short of the transverse wall. Interposed between the curved partitions which are connected to the transverse wall at one side of the central opening 52 are the ends of the curved partitions connected to the transverse wall at the other side of the central opening 52. It will thus be seen that alternate partitions located to one side of the transverse wall, are connected thereto, to the left-hand side of the opening 52, and that the intervening partitions are connected to the transverse wall, at the right-hand side of the central opening. By this construction, the fibers may be closely packed within the container without cutting the fibers into different lengths, and this is true, although the fibers be longer than usual. The fibers may be packed as shown in Fig. 13, in the space between two of the partitions and then bent around the end of one of the partitions and into the space between that partition and the next partition.

The arrangement of partitions in the cage or basket prevents the entanglement of the fibers, which now usually occurs during the boiling process, and the necessity of later treating the fibers so as to untangle them is obviated. The plants are to be charged into the basket as compactly as possible for they decrease in size when boiled, and have a tendency to travel with the force of the boiling water.

It is to be understood that, while I have described my invention as being particularly adapted for the treatment of fibrous plants to obtain the fibers therefrom, it may be utilized for other purposes, such, for instance, as bleaching fibrous substances, or for the boiling of paper pulp. My invention is susceptible of various modifications and changes which would be within the spirit of the invention without departing from the scope of the following claims.

What I claim is:—

1. In a boiler keir, a tank, endless chains mounted within and at opposite sides of said tank, rods between said chains from which the material treated is suspended, and means for operating said chains to raise and lower the rods.

2. In a boiler keir, a vertical tank having a removable top, endless chains located within and at opposite sides of said keir, rods extending between said chains and from which the material to be treated is suspended, sprocket wheels about which said chains pass, and means for rotating said sprocket wheels and actuating said chains to raise and lower said rods.

3. In a boiler keir, a vertical tank having a removable top, endless chains located within and at opposite sides of said tank, rods between said chains from which the material to be treated is suspended, and an operating mechanism for each of said chains comprising a sprocket wheel over which a chain passes, a rotatable shaft on which said sprocket wheel is mounted, a gear on said shaft, a second shaft, a gear mounted on said second shaft and meshing with said first-mentioned gear, a sprocket wheel on said second-mentioned shaft, an operating shaft, a sprocket wheel on said operating shaft, a chain connecting said sprocket wheels on said operating shaft and said second shaft, and a handle for rotating said operating shaft.

4. In a boiler keir, a vertical tank having a removable top, channel bars located within and at opposite sides of said tank, sprocket wheels mounted in the upper and lower ends of said channel bars, a chain in each of said channel bars passing about said sprocket wheels, rods between said chains from which the material to be treated is suspended, and means for actuating said sprocket wheels to cause said chains to travel and thus raise and lower said rods within the tank.

5. In a boiler keir, a tank having a metallic imperforate bottom provided with an upstanding circumferential flange, an annular channel in said flange, and vertical sides constructed of wood planks, the lower ends of which engage in said groove so that the wood will swell to form a tight joint between the sides of the tank and the bottom thereof; a removable top for said tank; and means for raising and lowering materials to be treated within said tank.

6. In a boiler keir, a furnace, a tank located upon said furnace and having a metallic bottom adapted to be directly heated by the flames of said furnace, a false bottom within said tank having a plurality of openings to permit circulation of the treating solution and distribution of the heat, a removable top for said tank, and means for raising and lowering the material treated within said tank.

7. In a boiler keir, a furnace, a tank upon said furnace and having a metallic imperforate bottom directly heated by the flames of said furnace, a false bottom within the tank having a plurality of openings to permit circulation of the treating fluid and distribution of the heat, endless chains within and located at opposite sides of said tank, means for suspending the material treated from said chains, means for causing said chains to travel to raise and lower the material to be treated, and a removable top for said tank.

8. In a boiler keir, a furnace, a tank located upon said furnace and adapted to be directly heated by the flames thereof, means for raising and lowering the materials to be treated within said tank, a removable top for closing said tank and having a central opening, and a nozzle within said opening for spraying the treating fluid into said tank.

9. In a boiler keir, a furnace, a tank mounted upon the furnace and the bottom of which is adapted to be directly heated by the flames of the furnace, means for raising and lowering the materials to be treated within said tank, a removable top for said tank, means for securing said top in position, a nozzle adapted to extend through an opening in said top for spraying the treating fluid into said tank, and a safety valve carried by the top to prevent excessive pressure within said tank.

10. A basket for boiler keirs, comprising a framework, and partitions therein, there being an open space at one end of each of said partitions to permit the fibers to be treated to be bent around the ends of the partitions.

11. A basket for boiler keirs, comprising a framework and partitions therein, the opposite ends of adjacent partitions being in spaced relation to said framework so as to permit the fibers to be treated to be bent about the ends of the partitions.

12. A basket for boiler keirs comprising a cylindrically-shaped framework, and concentric partitions within said framework, the adjacent partitions terminating short at their opposite ends of said framework so as to provide spaces and permit the fibers treated to be bent about the ends of the partitions.

13. A basket for boiler keirs comprising a cylindrically-shaped framework, a transverse wall, and concentric partitions on the opposite sides of said transverse wall, alternate concentric partitions terminating short at one end of said transverse wall and intervening partitions terminating short at the other end of said transverse wall.

14. A basket for boiler keirs comprising a framework, reticulated material for covering said framework, a transverse wall in said framework, and curved partitions connected at one end to said transverse wall and terminating at their other ends short thereof, adjacent partitions being connected at opposite ends of said transverse wall.

In testimony whereof I have hereunto set my hand.

KO MURAI.

Copies of this patent may be obtained for five cents each, by addressing the "Commissioner of Patents, Washington, D. C."